United States Patent Office 2,727,154
Patented Dec. 13, 1955

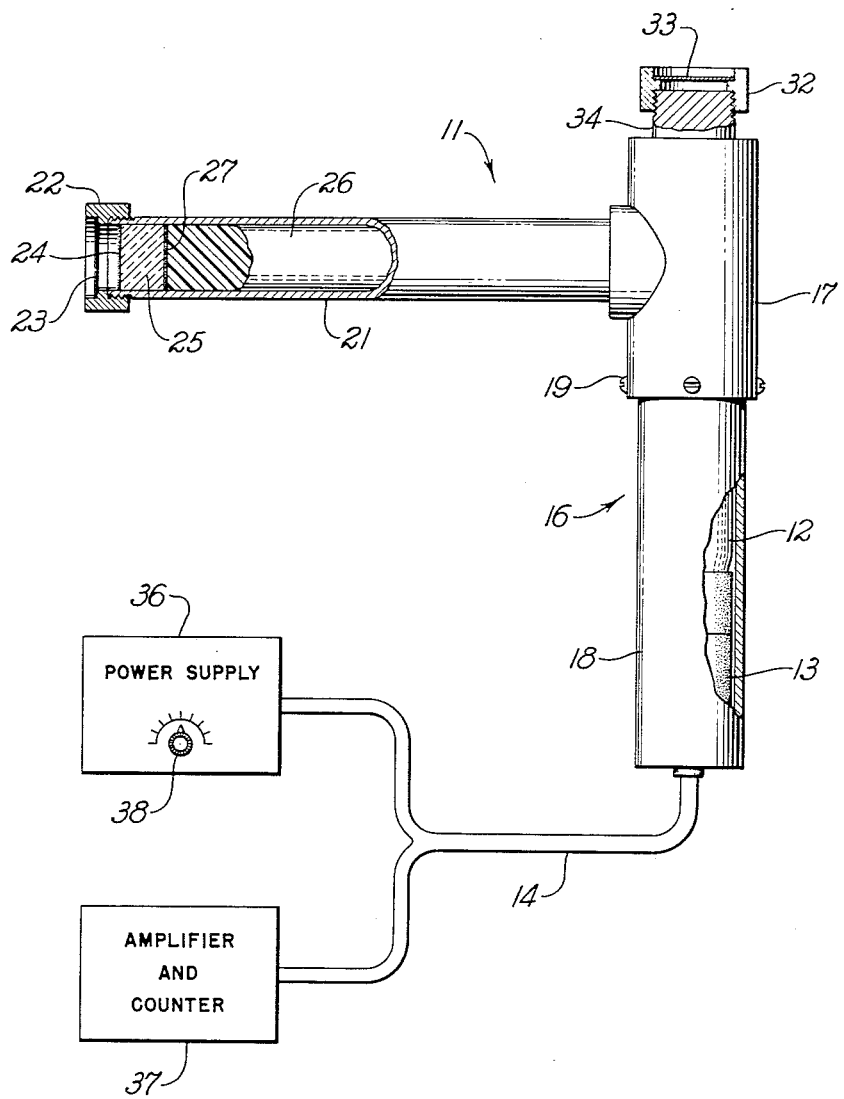

2,727,154

RADIATION DETECTOR

William W. Goldsworthy, Orinda, Calif., assignor to the United States of America as represented by the United States Atomic Energy Commission Application February 26, 1952, Serial No. 273,485

1 Claim. (Cl. 250—71)

The present invention relates to an improvement in the field of radiation detection and counting and in more particular to an improved device for either collectively or individually detecting elementary particles or rays, such as alpha, beta, and gamma radiation.

With the recent emphasis upon nuclear research and the increased use of radioactive materials in a variety of fields, the problem of radiation monitoring and detection has acquired added importance. Particularly in research work and to a lesser extent in radiation monitoring, it is often necessary not only to detect the presence and amount of radiation but also to differentiate between the various types thereof. Relatively little difficulty is encountered with respect to particles such as electrons, protons, etc., but efficiently counting and distinguishing between alpha particles, beta rays, and gamma rays has proven somewhat of a problem. Conventional counting equipment does not differentiate between alpha, beta, and gamma radiation as they each produce substantially the same detection signals so that only a total count is possible.

The present invention is adapted to indicate the presence and amount of alpha, beta, and gamma radiation either as a total count or with regard to certain combinations thereof as set out below, and is thus admirably suited for radiation detection and in particular for radiation monitoring, for example in an area survey meter. The above capabilities and advantages are attained by the accomplishment of the following objects.

It is an object of the present invention to provide an improved method and means for detecting radioactivity.

It is a further object of the present invention to provide an improved method and means for detecting either alpha particles or beta and gamma rays in the presence of alpha, beta, and gamma radiation.

It is a further object of the present invention to provide an improved method and means for combining different kinds of scintillation crystals to selectively indicate a predetermined kind of radiation in the presence of other radiation.

It is another object of the present invention to provide an improved and simplified portable radiation detector probe containing detection and amplification means.

It is still another object of the present invention to provide an improved radiation detector probe carrying interchangeable filters to selectively indicate types of radiation incident thereupon.

It is an additional object of the present invention to provide an improved directional radiation detector probe capable of area survey, as well as locating sources of radiation.

Numerous other objects and advantages of the present invention will become apparent from the following description of a preferred embodiment of the invention taken together with the accompanying drawing wherein the sole figure is an elevational view of a preferred embodiment of the invention shown partially in section and including attached electrical components shown in block form.

Considering now the elements of the illustrated embodiment of the invention and referring to the attached drawing, it will be seen that the probe 11 includes a photomultiplier tube 12 which is inserted in a socket 13. For convenience, socket 13 may include appropriate resistors whereby the individual connectors thereof are supplied the proper potentials when the input lead from cable 14 is energized to the proper voltage value. By this means the elements of photomultiplier tube 12 are properly energized with the various prescribed voltages without the necessity of including a large number of conductors in cable 14.

Photomultiplier tube 12 and socket 13 therefor are enclosed by a light-opaque envelope 16 which may be formed of a pair of cylinders 17 and 18 slideably engaging one another and held in position by screws 19 or the like. The lower end of bottom cylinder 18 may be closed about cable 14 which extends therethrough from socket 13, and the top end of upper cylinder 17 is closed to prevent stray light from reaching photomultiplier tube 12.

Envelope 16 also includes a hollow arm or tube 21 which extends from cylinder 17 in the vicinity of the light responsive element or cathode of photomultiplier tube 12. In the illustrated embodiment there is employed a photomultiplier tube adapted to be energized by light striking the side thereof and thus tube 21 extends through the side wall of cylinder 17; however, when an end-on photomultiplier tube is used, tube 21 extends from the top end of cylinder 17. Tube 21 is formed of light-opaque material which is also opaque to alpha particles and which has the outer end thereof formed for engagement with a cap 22 or the like removably attached thereto.

The open end of tube 21 is closed by a window 23 which is light opaque and which may be disposed in closing relation to the end of tube 21 by cap 22 which holds window 23 and is removably attached to the end of tube 21 by threaded engagement or other suitable means. Within tube 21 adjacent the capped end thereof there is provided a pair of scintillation crystals 24 and 25 which are aligned in tube 21 with each extending over substantially the entire cross sectional area thereof. A light piper 26 formed of a plastic or the like, such as Lucite, extends from crystals 24 and 25 to photomultiplier tube 12 through tube 21 and transmits light scintillations from crystals 24 and 25 to photomultiplier tube 12. Joinder of crystals 24 and 25 to light piper 26 may be accomplished by a transparent cement 27 as noted in more detail below.

Scintillation crystals 24 and 25 are formed of materials that produce scintillations of light when bombarded by particles or rays and the term "scintillation crystal" is herein taken to embrace substances having this property whether crystalline in structure or not. Thus scintillation crystal 25, at least as herein contemplated, may be a solid or may have a liquid form restrained by appropriate containing means. Two crystals are employed for the purpose of producing strong signals from beta and gamma rays, as well as from alpha particles. Commonly employed scintillation crystals, such as zinc sulphide, produce strong light scintillations when bombarded by alpha particles but produce very weak light pulses from beta or gamma rays, and in fact great difficulty is encountered in differentiating between signals from beta and/or gamma rays and the background noise in the photomultiplier tube. In the present invention there is employed a common scintillation material, such as zinc sulphide, as the first scintillation crystal 24 adjacent window 23, and another material, such as stilbene or the like, is employed as the second scintillation crystal 25 separated from window 23 by first crystal 24 and producing substantial light scintillations from beta and gamma rays. Second crystal 25 is transparent and may thus have a substantial thickness along the axis of tube 21 as light is readily transmitted therethrough. In practice second crystal 25 may be mounted upon the end of light piper 26 by means of transparent cement 27 and first crystal 24 may be secured to the front end of second crystal 25 adjacent window 23.

In order to further enhance the versatility of the present invention there is provided a second window 33 which may be mounted in a cap 32 identical to cap 22. Window 23 is formed of very thin foil of a light-opaque material and is designed to transmit alpha particles, while window 33 is formed of a light-opaque material of sufficient thickness to be opaque to alpha particles. Thus by alternately positioning windows 23 and 33 over the end of tube 21 the scintillation crystals are alternately exposed to and shielded from alpha particles. The window not in use may be conveniently attached to probe 11 by providing a stub 34 extending from envelope 16 and adapted to removably engage either cap 22 or 32, as shown.

The above-described probe 11 is connected by means of cable 14 to a power supply 36 which has its output connected to the cable leads extending to tube socket 13 in probe 11. Also provided is a counting circuit or scaler 37 which may include an amplifier and which is connected to the output lead of photomultiplier tube 12 in order to receive and indicate the signals therefrom. Power supply 36 produces an adjustable output voltage which may be controlled by means such as a knob 38 thereby providing a control of the gain or amplification of photomultiplier tube 12. Alternatively, the amplification of photomultiplier tube 12 may be controlled at probe 11 by providing switching means in tube socket 13 whereby the potential applied to the various elements or dynodes of photomultiplier tube 12 is changed.

With reference to the operation of the present invention, power supply 36 is turned on to energize the elements of photomultiplier tube 12 and counter 37 is energized to indicate the signals from tube 12. Care is to be taken that envelope 16 is tightly closed and that the desired window is in place closing the end of tube 21. With window 23 in position at the end of tube 21 alpha particles, beta rays, and gamma rays may enter tube 21 therethrough and alpha particles produce strong light scintillation in first crystal 24 (zinc sulphide or the like). Also beta and gamma rays, which have a much greater range than alpha particles, pass through window 23, first crystal 24, and into second crystal 25 wherein they produce nominally strong light scintillations. First crystal 24 is relatively unaffected by incident beta and gamma rays and the few scintillations produced by same therein are so weak as to be practically indistinguishable from the background noise of photomultiplier tube 12. The light scintillations produced in second crystal 25 by beta and gamma rays are of sufficient strength to be easily distinguishable and may be readily amplified by photomultiplier tube 12; however, these light signals are not as strong as the alpha produced scintillations occurring in first scintillation crystal 24. Thus by adjusting knob 38 to provide a high voltage output of power supply 36 the amplification of photomultiplier tube 12 is made large and scintillations produced by alpha, beta and gamma radiation is amplified by photomultiplier tube 12 and indicated by counter 37. By adjusting knob 38 to provide a relatively low voltage output of power supply 36, the gain or amplification of photomultiplier tube 12 is reduced so that only the intense light pulsations produced by alpha particles in first scintillation crystal 24 are amplified sufficiently by photomultiplier tube 12 to operate counter 37. Consequently, by adjusting the gain of photomultiplier tube 12, either alpha particles or the combination of alpha, beta and gamma radiation may be counted.

In addition to the above counting procedure, it is further possible to indicate only beta and gamma radiation, and this is done by replacing window 23 with window 33, as by the switching of caps 22 and 32. With window 33 in position across the end of tube 21 no alpha particles can enter tube 21; however, the longer range of beta and gamma rays allows them to pass through window 33, designed for just such discrimination, and by providing a high amplification in photomultiplier tube 12 the light scintillations produced in second crystal 25 are indicated.

From the foregoing it will be appreciated that the present invention has two variables, i. e., the amplification of photomultiplier tube 12 and the variation in the thickness of windows 23 and 33 disposed over the scintillation crystals. By proper adjustment of these variables, as noted above, it is possible to indicate either alpha particles, alpha, beta, and gamma radiation, or beta and gamma rays. It is to be further noted that probe 11 is quite portable and is thus not only adaptable for area survey work, i. e., monitoring of the atmosphere, but is also capable of use in locating sources of radiation.

Although the present invention has been disclosed with respect to a sole preferred embodiment, it will be appreciated by those skilled in the art that numerous variations and modifications are possible within the spirit and scope of the invention and thus the invention is not to be limtied except by the terms of the following claim.

What is claimed is:

An improved radiation detection device comprising a first scintillation crystal responsive to alpha particles and producing strong light scintillations therefrom, a second transparent scintillation crystal responsive to beta and gamma rays and producing light scintillations therefrom that are weaker than the alpha produced scintillations of said first crystal, an envelope disposed about said crystals and having an aperture therein with said first crystal being adjacent thereto and said second crystal being separated therefrom by said first crystal, a thin light-opaque window pervious to alpha, beta, and gamma radiation disposed across the aperture in said envelope, light responsive means accepting light scintillations from said crystals as indications of alpha, beta, and gamma radiation incident thereon, a variable amplifier connected to said light responsive means, and counting means connected to the output of said amplifier whereby large amplification energizes said counting means by signals from alpha, beta, and gamma radiation and low amplification energizes said counting means by signals from alpha particles only.

References Cited in the file of this patent

UNITED STATES PATENTS

| | | |
|---|---|---|
| 2,442,314 | Reid | May 25, 1948 |
| 2,534,668 | Gunderson | Dec. 19, 1950 |
| 2,559,219 | Ludeman | July 3, 1951 |
| 2,583,132 | Altar et al. | Jan. 22, 1952 |
| 2,650,309 | Webb et al. | Aug. 25, 1953 |

OTHER REFERENCES

"Scintillation Counters," Wouters AECD 2203, August 5, 1948, pp. 1–10.

"Instrumentation of Radioactivity," Pie/per—Science, vol. 112, Oct. 6, 1950, pp. 377–381.

"The Scintillation Counter," Coltman, Proceedings of the I. R. E., vol. 37, No. 6, June 1949, pp. 671–682.